(12) United States Patent
Matsumura

(10) Patent No.: US 9,715,828 B2
(45) Date of Patent: Jul. 25, 2017

(54) METER DISPLAY DEVICE FOR VEHICLE

(71) Applicant: KAWASAKI JUKOGYO KABUSHIKI KAISHA, Hyogo (JP)

(72) Inventor: Norikazu Matsumura, Hyogo (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 0 days.

(21) Appl. No.: 14/805,569

(22) Filed: Jul. 22, 2015

(65) Prior Publication Data

US 2016/0093209 A1    Mar. 31, 2016

(30) Foreign Application Priority Data

Sep. 25, 2014  (JP) .................................. 2014-195195

(51) Int. Cl.
| | |
|---|---|
| *B60Q 1/00* | (2006.01) |
| *G08G 1/0962* | (2006.01) |
| *B60K 37/02* | (2006.01) |
| *G01D 7/00* | (2006.01) |
| *G01D 7/08* | (2006.01) |

(Continued)

(52) U.S. Cl.
CPC ............ *G08G 1/0962* (2013.01); *B60K 37/02* (2013.01); *G01D 7/002* (2013.01); *G01D 7/08* (2013.01); *G01D 13/28* (2013.01); *G12B 11/02* (2013.01); *H05B 37/02* (2013.01); *B60K 2350/1064* (2013.01); *B60K 2350/203* (2013.01); *B60K 2350/2008* (2013.01); *B60K 2350/402* (2013.01); *B60K 2350/965* (2013.01)

(58) Field of Classification Search
CPC .. G08G 1/0962; B60K 37/02; G01D 5/34715; G01D 7/002; G01D 7/005; G01D 7/08; G01D 11/28; G01D 3/02; G01D 13/28; H05B 37/02; G12B 11/02
USPC ......................................................... 340/441
See application file for complete search history.

(56) References Cited

U.S. PATENT DOCUMENTS 6,906,634 B1   6/2005  Kuenzner et al.
7,501,939 B1 * 3/2009  Belikov ................. B60K 35/00
                                                   340/438

(Continued)

FOREIGN PATENT DOCUMENTS

DE   10 2005 011 824   9/2006
DE   10 2009 007 845   8/2010

(Continued)

OTHER PUBLICATIONS

Extended European Search Report issued Nov. 23, 2015 in European Application No. 15181092.6.

*Primary Examiner* — Jack K Wang
(74) *Attorney, Agent, or Firm* — Wenderoth, Linbd & Ponack, L.L.P.

(57) ABSTRACT

The invention provides a meter display device for a vehicle having improved visibility of indicated contents. A meter display device includes a pointer having a pointer position changed by shifting in a predetermined array direction in accordance with a continuously changing vehicle state to indicate the vehicle state, a dial having a plurality of numeral indicating portions configured to indicate the vehicle state at different levels, aligned at intervals in the array direction, and individually change lighting modes, and a controller configured to change the lighting modes of the plurality of numeral indicating portions in accordance with the vehicle state.

18 Claims, 6 Drawing Sheets

(51) Int. Cl.
*G12B 11/02* (2006.01)
*G01D 13/28* (2006.01)
*H05B 37/02* (2006.01)
*G08C 15/08* (2006.01)

(56) References Cited

U.S. PATENT DOCUMENTS

| | | | | |
|---|---|---|---|---|
| 2002/0140552 A1* | 10/2002 | Wada | .................... | B60K 37/02 340/438 |
| 2004/0145461 A1* | 7/2004 | Sandberg | ............ | B60R 16/0232 340/439 |
| 2011/0043348 A1* | 2/2011 | Blackard | ................. | F16H 63/42 340/439 |
| 2013/0096895 A1* | 4/2013 | Willard | ................. | B60K 37/02 703/8 |
| 2013/0174773 A1* | 7/2013 | Nagara | .................. | B60K 37/02 116/201 |
| 2014/0300459 A1 | 10/2014 | Oishi | | |
| 2016/0167513 A1* | 6/2016 | Arita | ..................... | B60K 35/00 340/441 |

FOREIGN PATENT DOCUMENTS

| | | |
|---|---|---|
| DE | 10 2012 008 855 | 11/2012 |
| JP | 2013-200183 | 10/2013 |
| WO | 2008/011493 | 1/2008 |
| WO | 2013/035887 | 3/2013 |

* cited by examiner

METER DISPLAY DEVICE FOR VEHICLE

BACKGROUND OF THE INVENTION

1. Field of the Invention

The present invention relates to a meter display device for a vehicle mounted on a vehicle.

2. Description of the Related Art

In a known meter display device for a vehicle, a pointer rotating on a substantially circular dial indicates an engine rotational speed scale provided in an outer circumferential portion of the dial so that a driver can visually recognize engine rotational speed (e.g. JP 2013-200183 A).

A meter display device, which indicates indicated contents while a driver is driving a vehicle, is required to be improved in visibility.

SUMMARY OF THE INVENTION

In view of the above, an object of the present invention is to provide a meter display device for a vehicle that has improved visibility of indicated contents.

In order to achieve the object mentioned above, the present invention provides a meter display device for a vehicle including: a pointer body having a pointer position changed by shifting in a predetermined array direction in accordance with a continuously changing vehicle state to indicate the vehicle state; a display plate having a plurality of index portions configured to indicate the vehicle state at different levels, aligned at intervals in the array direction, and individually change lighting modes; and a controller configured to change the lighting modes of the plurality of index portions in accordance with the vehicle state.

The meter display device for vehicle thus configured indicates the vehicle state by means of the pointer body as well as the lighting modes of the plurality of index portions. Such indication of the vehicle state by means of the measure in addition to the pointer body improves visibility of indicated contents.

Changing the lighting mode herein means changing information that is indicated by the index portion and is visible to a driver. Examples of changing the lighting mode include switching between lighting and shutting off the index portion, changing blinking intervals of the index portion, and changing a lighting color and brightness of the index portion.

In the meter display device for vehicle according to an aspect, the plurality of index portions has index values indicating the vehicle state, and the controller differentiates a lighting mode of an index value group including a corresponding index value to the vehicle state and aligned on a first side in the array direction with respect to the corresponding index value and a lighting mode of an index value group aligned on a second side in the array direction with respect to the corresponding index value.

According to this aspect, the corresponding index value is highlighted by switching the lighting mode of the index value group. A driver checks a corresponding index portion thus highlighted to recognize the vehicle state. This configuration improves driver's visibility of indicated contents.

In the meter display device for vehicle according to an aspect, the controller differentiates a lighting mode of a corresponding index portion to the vehicle state and the lighting modes of the index portions other than the corresponding index portion.

According to this aspect, the lighting mode of the corresponding index portion is differentiated from the lighting modes of the index portions other than the corresponding index portion so as to highlight the corresponding index portion. A driver checks the corresponding index portion thus highlighted as compared to the remaining index portions to recognize the vehicle state. This configuration improves driver's visibility of indicated contents.

In the meter display device for vehicle according to an aspect, when a predetermined condition is satisfied, the controller brings the lighting modes of the plurality of index portions into lighting modes different from lighting modes of the plurality of index portions before the condition is satisfied.

According to this aspect, the lighting modes of the plurality of index portions differ between before and after the condition is satisfied. The plurality of index portions changes the lighting modes to highlight the fact that the condition is satisfied. A driver can thus visually recognize that the condition is satisfied.

Examples of the condition to be satisfied include the vehicle state, as well as temporal conditions such as a time signal and a travel period, special control conditions for start, end, and continuation of special control states brought temporarily during travel such as ABS actuation, traction control actuation, launch actuation, and limit control actuation, and states of trouble or disorder.

In the meter display device for vehicle according to an aspect, upon providing a set value in response to a setting command of a driver, the controller changes the lighting modes of the plurality of index portions in accordance with the setting command.

According to this aspect, when the driver provides the set value, the lighting modes of the plurality of index portions change in accordance with the setting command. The driver checks the lighting modes of the index portions to visually recognize the setting command of the driver. For example, the number of the index portions to be lighted increases as the set value increases for easier recognition of the degree of the set value.

The set value can relate to shift-up rotational speed, launch rotational speed, ABS actuatability, or traction control actuatability.

In the meter display device for vehicle according to an aspect, the set value relates to the vehicle state, and the controller brings the lighting modes of the plurality of index portions into the same lighting modes as lighting modes of the plurality of index portions upon the vehicle state having a vehicle state value reaching the set value during travel when the setting command reaches the set value.

According to this aspect, the lighting modes of the plurality of index portions during travel are indicated again upon provision of the set value so as to enable the driver to recognize more easily the degree of the set value.

In the meter display device for vehicle according to an aspect, the vehicle state relates to rotational speed of a driving source, the pointer body has a rotation center and is angularly displaced about the rotation center in accordance with the rotational speed, the array direction is equal to a circumferential direction around the rotation center, the plurality of index portions includes numeral indicating portions aligned in the array direction, and the numeral indicating portions correspond to the pointer position indicating the rotational speed.

According to this aspect, the position of the pointer body and the numeral indicating portions in the index portions achieve clear indication of the rotational speed of the driving source. The driver checks the rotational speed of the driving source thus clearly indicated to recognize the rotational speed of the driving source. This configuration improves driver's visibility of indicated contents.

The present invention also provides a meter display device for a vehicle including: a pointer body having a pointer position changed by shifting in a predetermined array direction in accordance with a continuously changing vehicle state to indicate the vehicle state; and a display plate having a plurality of index portions configured to indicate the vehicle state at different levels, aligned at intervals in the array direction, and individually change lighting modes.

The meter display device for vehicle thus configured indicates the vehicle state by means of the pointer body as well as the changing lighting modes of the plurality of index portions. This configuration diversifies indication of the vehicle state. Accordingly, indication of the vehicle state to be notified to the driver can be highlighted or added by individually changing the lighting modes of the index portions. This leads to improvement in driver usability.

The meter display device for vehicle according to the present invention diversifies indication of the vehicle state so as to improve visibility of indicated contents.

DETAILED DESCRIPTION OF THE INVENTION

A meter display device for a vehicle according to an embodiment of the present invention will now be described in detail with reference to the drawings.

Figure 1:
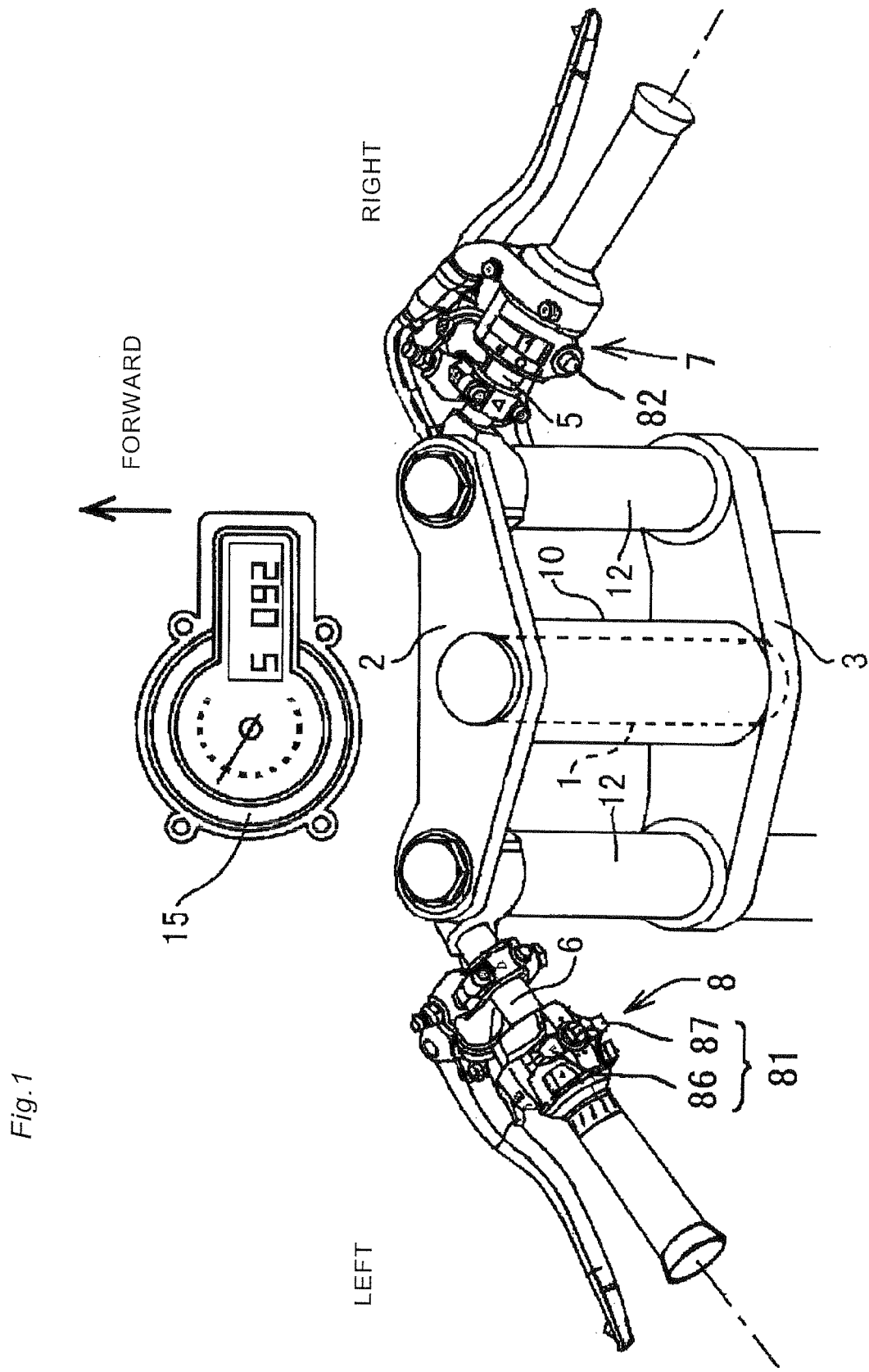
FIG. 1 is an upper rear perspective view of a steering unit of a motorcycle including a meter display device according to the present invention.

FIG. 1 depicts the meter display device according to the embodiment of the present invention and a steering unit of a motorcycle including the meter display device. As depicted in FIG. 1, the steering unit of the motorcycle includes a steering axle 1, a steering upper bracket 2, a steering under bracket 3, a right handlebar 5, and a left handlebar 6.

The steering axle 1 is rotatably supported by a head tube 10 provided at the front end a vehicle frame (not depicted). The lateral width center of the upper bracket 2 is firmly fixed to the upper end of the steering axle 1, whereas the lateral width center of the under bracket 3 is firmly fixed to the lower end of the steering axle 1. The lateral width ends of the upper bracket 2 and the lateral width ends of the under bracket 3 are joined to right and left front forks 12 extending downward. The lower ends of the front forks 12 support a front wheel (not depicted).

The right handlebar 5 is firmly fixed to the right end of the upper bracket 2 and the upper end of the right front fork 12, and extends backward to the right. The right handlebar 5 is provided with a right handle switch device 7 having a push-button function switch 82.

The left handlebar 6 is firmly fixed to the left end of the upper bracket 2 and the upper end of the left front fork 12, and extends backward to the left. The left handlebar 6 is provided with a left handle switch device 8 having a push-button indication change switch 81. The indication change switch 81 includes a forward operation unit 86 and a backward operation unit 87.

A meter display device 15 is provided ahead of the upper bracket 2 and is located substantially in the center in the vehicle width direction. The meter display device 15 is supported by the head tube 10 via a bracket and the like (not depicted). The meter display device 15 shifts rightward and leftward (is angularly displaced) about the steering axle 1.

Figure 2:
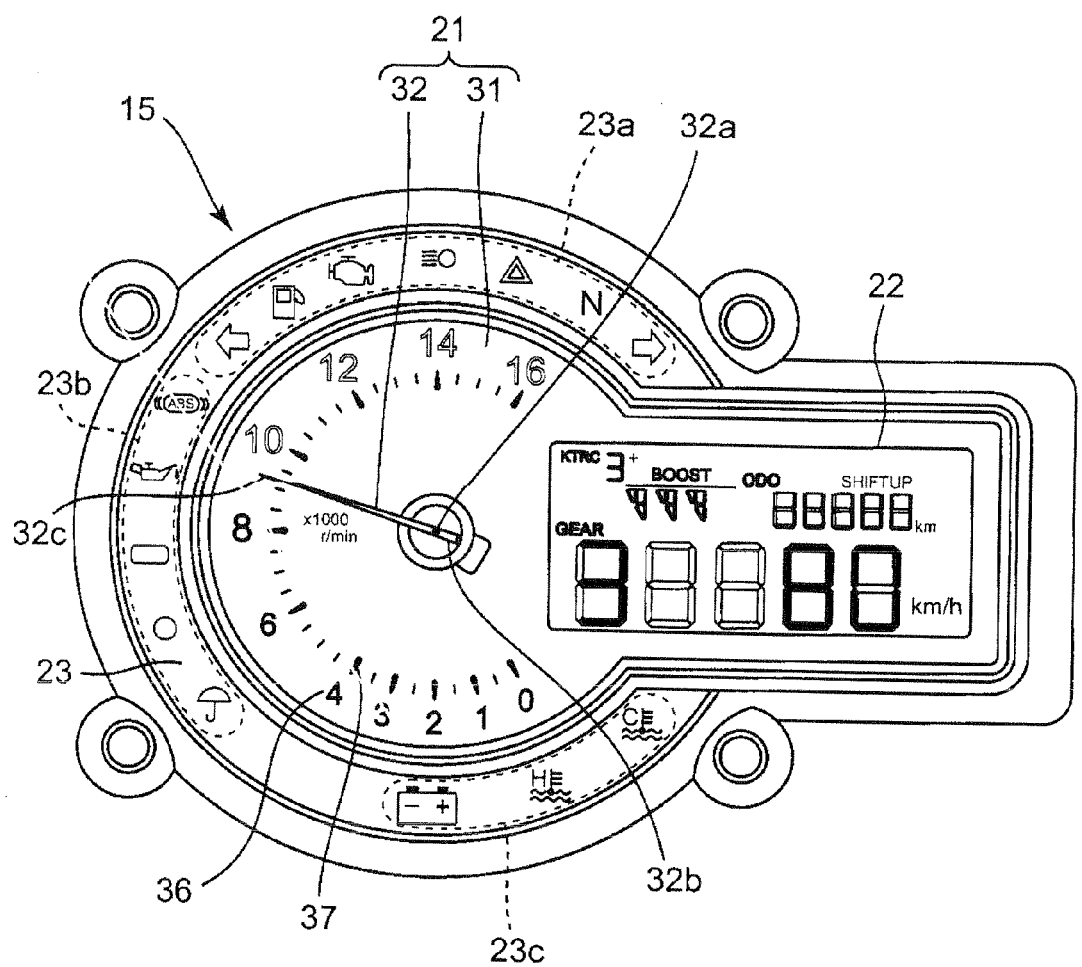
FIG. 2 is a front view of the meter display device.

FIG. 2 is a plan view of the meter display device 15.

As depicted in FIG. 2, the meter display device 15 includes a tachometer 21, a liquid crystal display portion 22 disposed adjacent to the tachometer, and an indicator region 23 disposed in a circular arc shape outside the tachometer 21.

The tachometer 21 includes a substantially circular dial 31 and a pointer 32 rotating on the dial 31. The tachometer 21 indicates rotational speed of an engine functioning as a driving source. The dial 31 exemplifies a display plate. The pointer 32 exemplifies a pointer body. Engine rotational speed exemplifies a vehicle state value.

The pointer 32 is a bar member in red. The pointer 32 has a rotation center 32a, a proximal portion 32b located at a first end closer to the rotation center 32a, and a distal portion 32c located at a second end. The rotation center 32a is located substantially in the center of the dial 31. The pointer 32 is controlled in terms of angular displacement about the rotation center 32a in accordance with engine rotational speed, whereas the proximal portion 32b and the distal portion 32c are angularly displaced in the circumferential direction about the rotation center 32a. The tip of the distal portion 32c of the pointer 32 indicates a pointer position of the pointer 32.

The pointer 32 has an angular displacement range of at least 180 degrees, for example. The angular displacement range of the pointer 32 is set to at least 220 degrees in the present embodiment. The pointer 32 has a pointer position located at a stop angular position when engine rotational speed is 0 rpm. The stop angular position is located below the rotation center 32a as well as on the right in the vehicle width direction of the rotation center 32a. The pointer 32 is driven to rotate by a motor (not depicted) and is angularly displaced clockwise in a predetermined array direction in accordance with engine rotational speed to provide analog indication of engine rotational speed that changes continuously.

Angular change of the pointer 32 relative to change in engine rotational speed is differentiated between a case where the engine rotational speed is in a predetermined low rotational speed range and a case where the engine rotational speed is in a high rotational speed range that is higher than the low rotational speed range. Angular change relative to a predetermined change degree of engine rotational speed is set to be small in the low rotational speed range whereas angular change relative to a predetermined change degree of engine rotational speed is set to be large in the high rotational speed range. Accordingly, the angular change can be made small in an engine rotational speed range with a low visual recognition demand from a driver (the low rotational speed range) whereas the angular change can be made large in an engine rotational speed range with a high visual recognition demand from a driver (the high rotational speed range) in a predetermined angular range, so as to improve usability.

The dial 31 is a plate member having a black surface. The dial 31 has a plurality of numeral indicating portions 36 serving as index portions, scale portions 37, and a plurality of illuminants (not depicted; specifically LEDs). The numeral indicating portions 36 and the scale portions 37 are located in a circular arc shape in an outer circumferential portion of the dial 31. The plurality of illuminants is provided in the dial 31.

The numeral indicating portions 36 have index values for indication of engine rotational speed (0 rpm to 16000 rpm). The numeral indicating portions 36 are aligned in the circular arc shape in the circumferential direction around the rotation' center 32a of the pointer 32. Specifically, the numeral indicating portions 36 are disposed in the angular range of the pointer position in which the pointer 32 is angularly displaced. The numeral indicating portions 36 according to the present embodiment have a plurality of numerals ("0", "1", "2", "3", "4", "6", "8" "10" "12", "14", and "16"). The numeral indicating portions 36 are disposed clockwise in the circumferential direction around the rotation center 32a of the pointer 32 in the order from "0" located at a lower right position in the outer circumferential portion of the dial 31 to "16" located at an upper right position. The numeral indicating portions 36 are aligned in the circumferential direction at radial distances larger than a radial distance from the rotation center 32a of the pointer 32 to the pointer position of the pointer 32. Accordingly, the region of the numeral indicating portions 36 is located radially outside a shift range of the pointer position of the pointer 32 in a front view. Angular displacement of the pointer 32 causes change of the numeral indicating portion 36 close to the pointer position of the pointer 32.

The numeral indicating portions 36 have larger numerals as proceeding clockwise in the circumferential direction, and have engine rotational speed indicated by the pointer position of the pointer 32 and numerals corresponding to the engine rotational speed. The pointer position of the pointer 32 provides a numeral indicating engine rotational speed. Specifically, the stop angular position corresponds to "0". The pointer position of the pointer 32 indicating the engine rotational speed "X×1000 rpm" corresponds to "X" (X is an arbitrary integer value).

In the numeral indicating portions 36, engine rotational speed not less than a predetermined value is indicated in a size larger than that of engine rotational speed less than the predetermined value. In other words, engine rotational speed not less than the predetermined value is indicated with a larger light emitting amount. The numeral indicating portions 36 indicating engine rotational speed not less than 8000 rpm are set to have a larger size in the present embodiment. The rotational speed of the larger size is set to have a value larger than that of the rotational speed where angular change is switched relatively to change in engine rotational speed set to the pointer 32. The rotational speed of the larger size can be set to have a value not less than that of regular rotational speed at which the motorcycle will travel at regular constant speed.

The numeral indicating portions 36 can be individually changed in lighting mode. The numeral indicating portions 36 according to the present embodiment are each provided with the illuminant that is individually controlled to individually light the corresponding numeral indicating portion 36. The numeral indicating portions 36 are lighted in red that is the color of the pointer 32. The numeral indicating portions 36 are shut off into black that is the color of the surface of the dial 31. The numeral indicating portions 36 being shut off are thus hard to recognize.

FIG. 2 indicates that the numeral indicating portions 36 being painted in black are lighted whereas the numeral indicating portions 36 being outlined are shut off. When the pointer position of the pointer 32 indicates arbitrary rotational speed, the numeral indicating portion 36 corresponding to the pointer position of the pointer 32 and the numeral indicating portions 36 located on the counterclockwise side of this numeral indicating portion 36 are each lighted. In contrast, the numeral indicating portions 36 located on the clockwise side of the numeral indicating portion 36 corresponding to the pointer position of the pointer 32 are each shut off. In the present embodiment, the numeral indicating portions 36 having values not more than that of the engine rotational speed indicated by the pointer 32 are each lighted whereas the numeral indicating portions 36 having values more than that of the engine rotational speed indicated by the pointer 32 are each shut off.

The scale portions 37 have a plurality of scales. The scale portions 37 are aligned in the circular arc shape in the circumferential direction around the rotation center 32a of the pointer 32. Specifically, the scale portions 37 are disposed in the angular range of the pointer position in which the pointer 32 is angularly displaced. The scale portions 37 according to the present embodiment are aligned in the circumferential direction at radial distances equal to the radial distance from the rotation center 32a of the pointer 32 to the pointer position of the pointer 32. Accordingly, the region of the scale portions 37 is overlapped with the shift range of the pointer position of the pointer 32 in a front view. Angular displacement of the pointer 32 causes change of the scale portions 37 overlapped with the pointer position of the pointer 32.

More particularly, the scale portions 37 are disposed clockwise at equal intervals from the lower right position in the outer circumferential portion of the dial 31 (corresponding to the numeral indicating portion 36 having "0") to the upper right position (corresponding to the numeral indicating portion 36 having "16"). The scale portions 37 are provided at every 500 rpm at the positions indicating engine rotational speed (0 rpm to 16000 rpm). The scale portions 37 corresponding to the numeral indicating portions 36 are larger in size than the scale portions 37 not corresponding to any of the numeral indicating portions 36.

Each of the scale portions 37 can be emitted by a light emitting source (not depicted) corresponding to the scale portion 37. The scale portions 37 are all lighted when the motorcycle completes preparation for travel, whereas the scale portions 37 are all shut off when the motorcycle terminates traveling. The scale portions 37 are lighted typically in white, but the scale portions 37 located at the upper right positions in the outer circumferential portion of the dial 31 (corresponding to the numeral indicating portions 36 having "14" to "16") are lighted in red. These scale portions 37 lighted in red indicate the so-called red zone of engine rotational speed.

The liquid crystal display portion 22 displays with liquid crystal, information other than the information indicated by the tachometer 21, such as vehicle speed, a gear position, an odometer, an integrating meter, time, water temperature, a travel mode, and error information.

The indicator region 23 indicates information other than the information in the tachometer 21 and the information in the liquid crystal display portion 22. The indicator region 23 extends in a circular arc shape in a range not less than 180 degrees around the rotation center 32a of the pointer 32 from a lower right position to an upper right position of the tachometer 21. The indicator region 23 according to the present embodiment is provided in an angular range larger than the angular range around the rotation center 32a in the region of the numeral indicating portions 36.

The indicator region 23 has an upper portion 23a where indication items of the vehicle state, such as neutral indication, high beam indication, indication of operation of right and left blinkers, indication of decrease in fuel remaining quantity, and hazard indication, are disposed at intervals in the circumferential direction. The indicator region 23 has a left portion 23b where indication items of disorder and modes, such as disorder of an anti-lock brake system (ABS) device, disorder of engine oil pressure decrease, and a rainy mode, are disposed at intervals in the circumferential direction. The indicator region 23 has a lower right portion 23c where indication items of the vehicle state, such as water temperature indication (low water temperature), water temperature indication (high water temperature), and charge alert indication, are disposed at intervals in the circumferential direction. The indication items in the indicator region 23 are each lighted by an illuminant.

Figure 3:
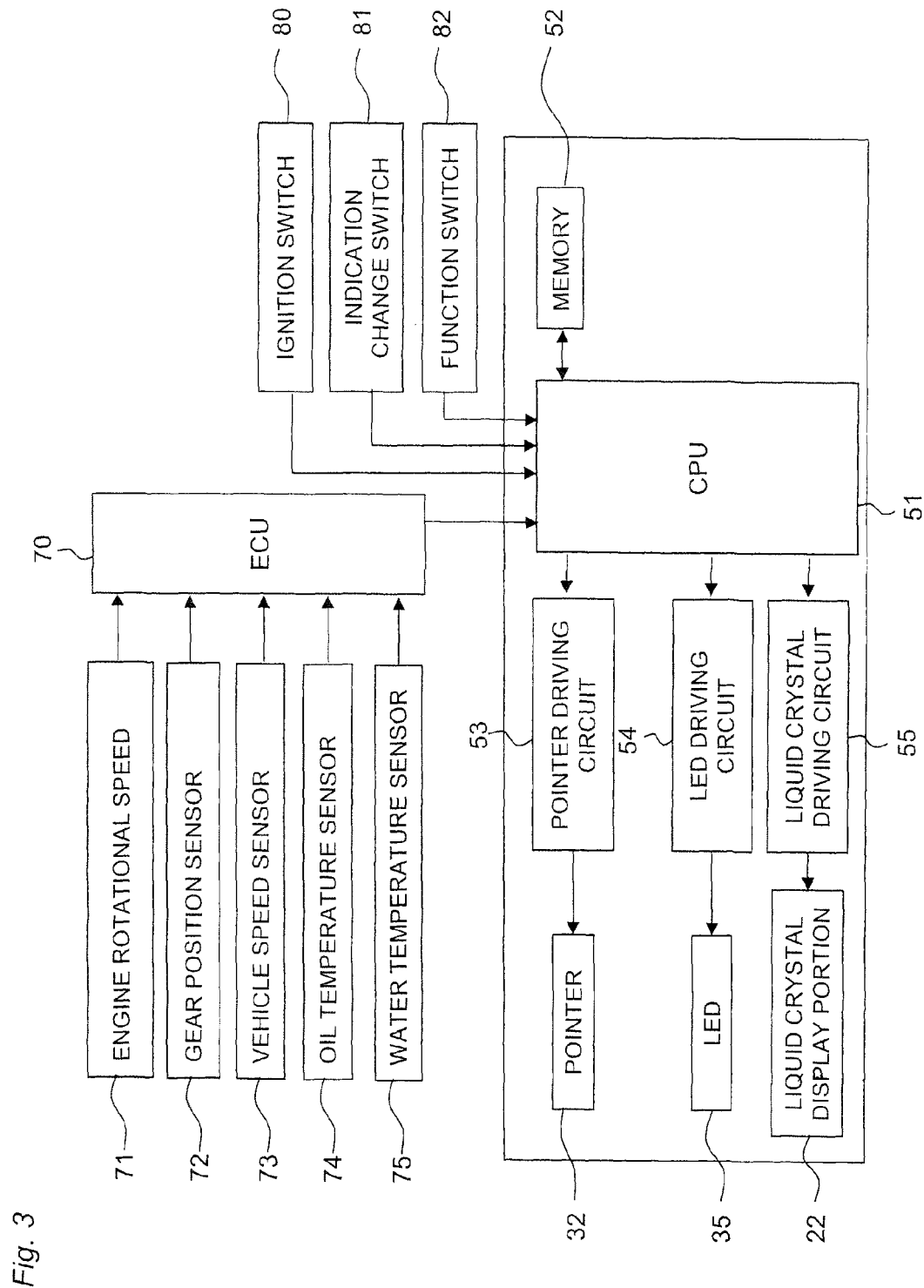
FIG. 3 is a block diagram of the meter display device.

FIG. 3 is a block diagram of the meter display device 15.

As depicted in FIG. 3, the meter display device 15 includes a CPU 51 exemplifying a controller, a memory 52, a pointer driving circuit 53, an LED driving circuit 54, and a liquid crystal driving circuit 55. The CPU 51 is electrically connected to the memory 52 and the relevant devices 53 to 55. The CPU 51 is electrically connected to an engine control unit (ECU) 70 configured to control the vehicle state, an ignition switch 80, the indication change switch 81, and the function switch 82.

The memory 52 includes a ROM and a RAM. The ROM is a nonvolatile semiconductor memory such as an EEPROM or a flash memory and stores various control programs and initial set values. The RAM temporarily stores data transmitted from various sensors to be described later, control programs, and set contents, as working memory.

The CPU 51 controls input and output of various signals transmitted in the meter display device 15. The CPU 51 executes the control programs stored in the ROM of the memory 52 when the ignition switch 80 is turned ON, and reads various data and signals necessary for the execution out of the RAM of the memory 52.

The pointer driving circuit 53 controls rotation of the pointer 32 of the tachometer 21. The pointer 32 is angularly displaced by the pointer driving circuit 53 and the motor (not depicted) in accordance with an electrical signal transmitted from the ECU 70 or one of the sensors.

The LED driving circuit 54 controls lighting or shutting off each one of a plurality of LEDs 35 in the tachometer 21.

The liquid crystal driving circuit 55 controls to drive liquid crystal in order to display various vehicle state information in the liquid crystal display portion 22.

The ECU 70 transmits, to the CPU 51, signals relevant to various vehicle state information received from the sensors configured to detect various vehicle state information, such as an engine rotational speed sensor 71, a gear position sensor 72, a vehicle speed sensor 73, an oil temperature sensor 74, and a water temperature sensor 75. In other words, the ECU 70 transmits, to the CPU 51, vehicle state information such as engine rotational speed, a gear position, vehicle speed, oil temperature, and water temperature.

When the function switch 82 is pushed, the function switch 82 transmits a signal relevant to a setting command to the CPU 51 so as to sequentially change indicated contents in the liquid crystal display portion 22 or the like. When the indication change switch 81 is pushed, the indication change switch 81 transmits a signal relevant to a setting command to the CPU 51 so as to provide a set value in accordance with the setting command. Specifically, when the forward operation unit 86 (see FIG. 1) of the indication change switch 81 is pushed, a set value displayed in the liquid crystal display portion 22 or the like can be increased by one. When the backward operation unit 87 (see FIG. 1) of the indication change switch 81 is pushed, the set value or the like can be decreased by one.

Figure 4:
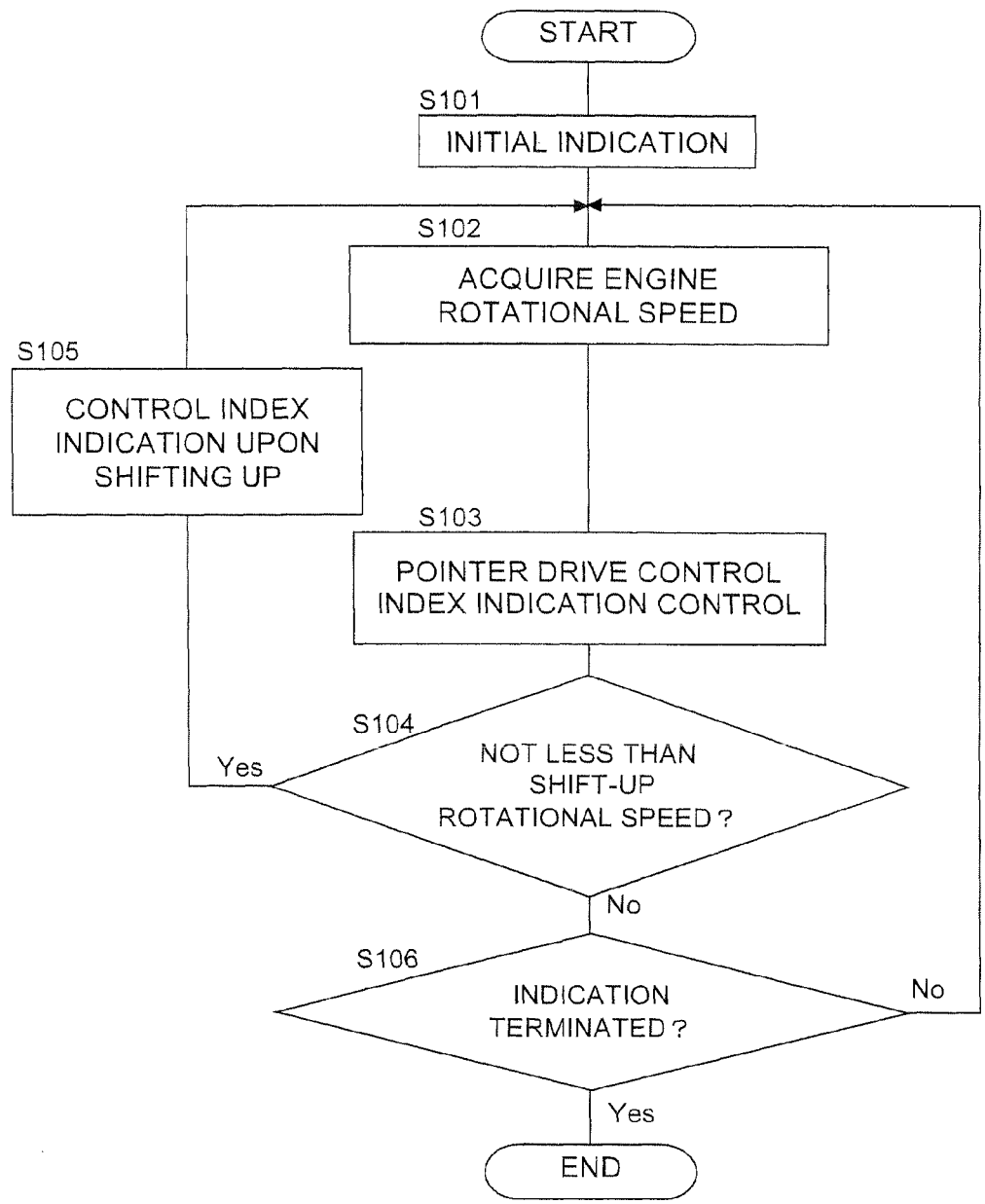
FIG. 4 is an explanatory flowchart of operation of the meter display device during travel.

Operation of the meter display device 15 during travel will be described next with reference to FIGS. 2 to 4. FIG. 4 is a flowchart of operation of the meter display device 15 during travel.

As depicted in FIG. 4, when the ignition switch 80 is initially turned ON to start operation of the meter display device 15, the CPU 51 causes, via the liquid crystal driving circuit 55, the liquid crystal display portion 22 to display an initial screen in step S101. Subsequently in step S102, the CPU 51 acquires information on engine rotational speed from the engine rotational speed sensor 71 via the ECU 70.

Next in step S103, the CPU 51 controls to drive the pointer 32 via the pointer driving circuit 53 in accordance with the acquired information on engine rotational speed and controls to light or shut off the plurality of LEDs 35 via the LED driving circuit 54 so as to control lighting modes of the numeral indicating portions 36.

Specifically, as depicted in FIG. 2, the CPU 51 lights the numeral indicating portions 36 having "0" to "8" and shuts off the numeral indicating portions 36 having "10" to "16" if the engine rotational speed is not less than 8000 rpm and less than 10000 rpm. If the engine rotational speed increases to reach or exceed 10000 rpm, the CPU 51 additionally lights the numeral indicating portion 36 having "10". If the engine rotational speed thereafter decreases to be not less than 8000 rpm and less than 10000 rpm, the CPU 51 lights the numeral indicating portions 36 having "0" to "8" and shuts off the numeral indicating portions 36 having "10" to "16".

Subsequently in step S104, the CPU 51 reads shift-up rotational speed as a set value stored in the memory 52 and determined whether or not the engine rotational speed is not less than the predetermined shift-up rotational speed. The flow proceeds to step S105 if the engine rotational speed is not less than the shift-up rotational speed, whereas the flow proceeds to step S106 if the engine rotational speed is less than the shift-up rotational speed.

In step S105, the CPU 51 controls to light or shut off the plurality of LEDs 35 via the LED driving circuit 54 so as to bring the numeral indicating portions 36 into the lighting modes for shifting up. Specifically, the lighted numeral indicating portions 36 are blinked. The lighting modes notify a driver that engine rotational speed has reached shift-up rotational speed. The flow then proceeds to step S102 indicated in FIG. 4.

In step S106, the CPU 51 determines whether or not indication is terminated, that is, the ignition switch is OFF. The flow proceeds to step S102 if the ignition switch is not OFF whereas the meter display device 15 terminates its operation if the ignition switch is OFF.

Figure 5:
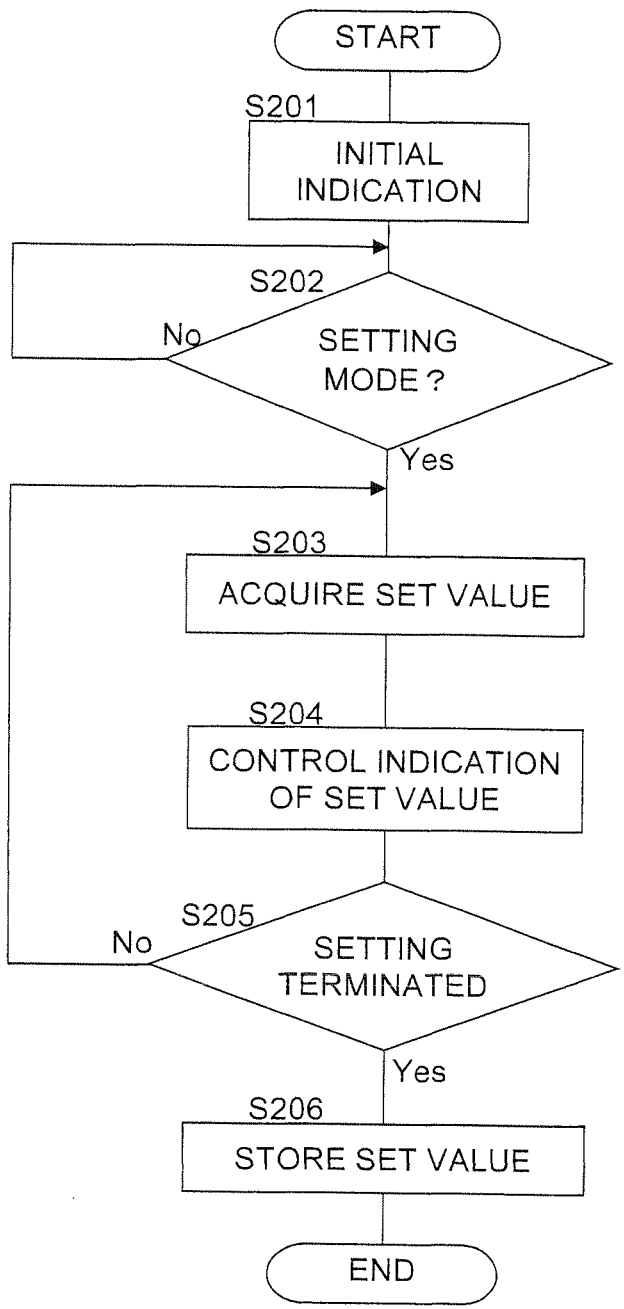
FIG. 5 is an explanatory flowchart of operation of the meter display device upon provision of a set value.
Figure 6:
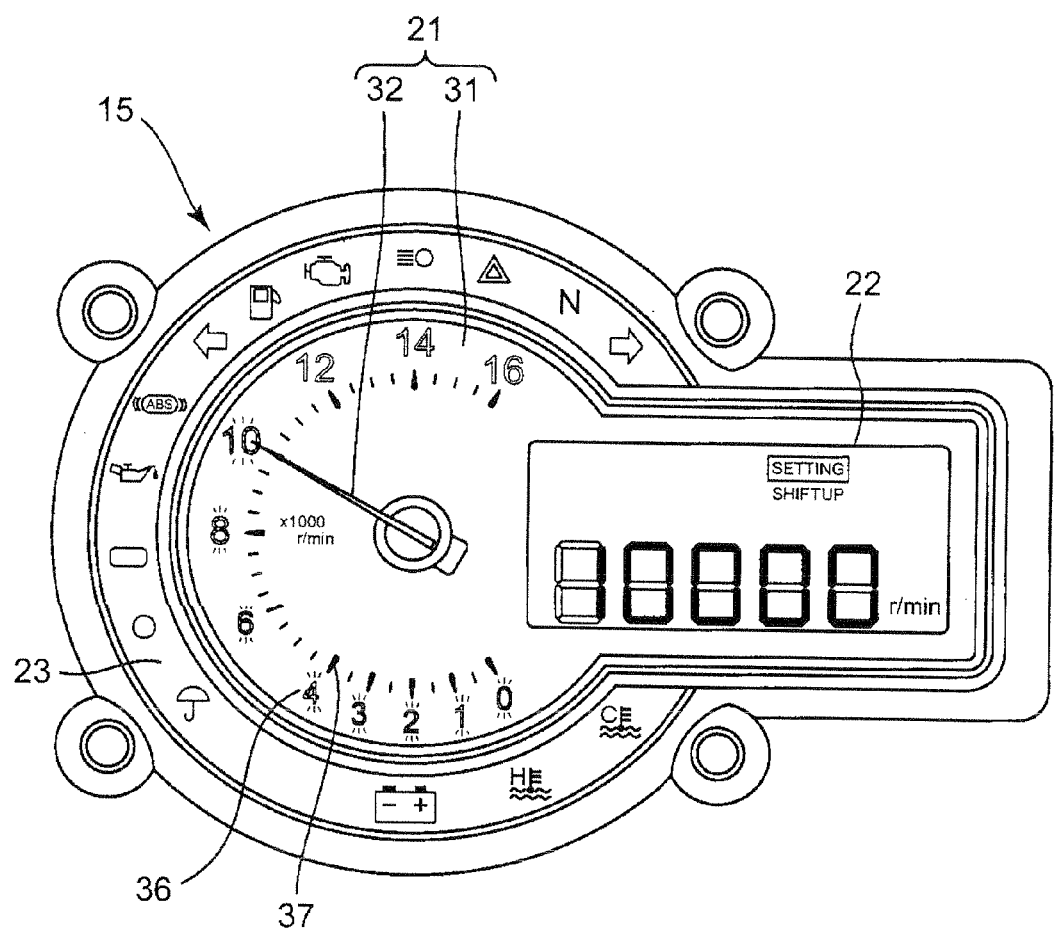
FIG. 6 is a front view of the meter display device upon provision of the set value.

Operation of the meter display device 15 upon provision of a set value (shift-up rotational speed) will be described next with reference to FIGS. 3, 5, and 6. FIG. 5 is a flowchart of operation of the meter display device 15 upon provision of the set value. FIG. 6 is a front view of the meter display device 15 upon provision of the set value.

Upon provision of the set value, the meter display device 15 comes into an indication mode similar to the indication mode in a case where the vehicle state has the set value while the motorcycle is traveling. Specifically, as depicted in FIG.

5, when the ignition switch 80 is initially turned ON to start operation of the meter display device 15, the CPU 51 causes, via the liquid crystal driving circuit 55, the liquid crystal display portion 22 to display an initial screen in step S201. Subsequently in step S202, the CPU 51 determines whether or not the meter display device 15 is in a setting mode, that is, the indication change switch 81 is turned ON. The flow proceeds to step S203 if the indication change switch 81 is turned ON.

In step S203, the CPU 51 acquires a set value, more specifically, acquires command information on the set value from a driver via the function switch 82.

Subsequently in step S204, the CPU 51 causes the liquid crystal display portion 22, via the liquid crystal driving circuit 55, to display a setting screen in accordance with the acquired command information on the set value. The CPU 51 lights or shuts off the plurality of LEDs 35 via the LED driving circuit 54 so as to control the lighting modes of the numeral indicating portions 36.

Specifically, as depicted in FIG. 6, the CPU 51 causes the liquid crystal display portion 22 to display that the set value is 10000 rpm. The CPU 51 angularly displaces the pointer 32 to the pointer position corresponding to the set value, blinks the numeral indicating portions 36 ("0" to "10") indicating rotational speed of a value not more than the set value, and shuts off the numeral indicating portions 36 ("12" to "16") indicating rotational speed of a value more than the set value. These lighting modes notify a driver which lighting modes the numeral indicating portions 36 come into when engine rotational speed reaches the set value.

Subsequently in step S205 in FIG. 5, the CPU 51 determines whether or not setting is terminated, that is, whether or not a driver inputs to fix a set value with the function switch 82. The flow proceeds to step S203 if a driver has not inputted to fix a set value, whereas the flow proceeds to step S206 if a driver has inputted to fix a set value. In the latter case, the CPU 51 stores the set value in the memory 52 and terminates provision of the set value.

The meter display device 15 thus configured indicates engine rotational speed by means of the pointer 32 as well as the lighting modes of the plurality of numeral indicating portions 36. Such indication of engine rotational speed by means of the measure in addition to the pointer 32 improves visibility of indicated contents.

Furthermore, the lighting modes of the plurality of numeral indicating portions 36 are switched to highlight the numeral indicating portion 36 corresponding to engine rotational speed. A driver checks the numeral indicating portion 36 thus highlighted to recognize the engine rotational speed. This configuration improves driver's visibility of indicated contents.

The lighting mode of the numeral indicating portion 36 corresponding to engine rotational speed is differentiated from the lighting modes of the numeral indicating portions 36 other than the numeral indicating portion 36 corresponding to the engine rotational speed, so as to highlight the numeral indicating portion 36 corresponding to the engine rotational speed. A driver checks the numeral indicating portion 36 corresponding to the engine rotational speed and highlighted as compared to the remaining numeral indicating portions 36, so as to recognize the engine rotational speed. This configuration improves driver's visibility of indicated contents.

The lighting modes of the plurality of numeral indicating portions 36 are differentiated between before and after engine rotational speed reaches shift-up rotational speed. The plurality of numeral indicating portions 36 change the lighting modes to highlight the fact that the engine rotational speed has reached the shift-up rotational speed. A driver thus visually recognizes that the engine rotational speed has reached the shift-up rotational speed.

This can apply to the case where engine rotational speed reaches shift-up rotational speed, as well as to cases of satisfying temporal conditions such as a time signal and a travel period, special control conditions for start, end, and continuation of special control states brought temporarily during travel such as ABS actuation, traction control actuation, launch actuation, and limit control actuation, and states of trouble or disorder.

When a driver provides a set value, the lighting modes of the plurality of numeral indicating portions 36 change in accordance with the command information. A driver checks the lighting modes of the numeral indicating portions 36 to visually recognize the setting command of the driver. For example, the number of the numeral indicating portions 36 to be lighted increases as the set value increases for easier recognition of the degree of the set value.

The set value can indicate, instead of shift-up rotational speed, launch rotational speed, ABS actuatability, or traction control actuatability.

Furthermore, the lighting modes of the plurality of numeral indicating portions 36 during travel are indicated again upon provision of the set value so as to enable a driver to recognize more easily the degree of the set value.

The indicator region 23 extends in the circular arc shape in a range not less than substantially 180 degrees in the circumferential direction of the tachometer 21 from a lower left position to an upper right position of the tachometer 21. The various indicators can be increased in number and in size as compared to a case where these indicators are disposed in the liquid crystal display portion 22 or the like.

The meter display device 15 according to the present invention is suitably applicable to a saddle type vehicle such as a motorcycle. Such a saddle type vehicle has an indication region smaller than that of a four-wheeled vehicle and is thus limited in terms of increasing indicators such as a shift-up indicator. The present invention improves indication of information such as a vehicle state value to a driver without increasing indicator types, and thus prevents increase in size of the meter display device.

For a driver on a saddle type vehicle such as a motorcycle, a visible direction of the meter display device 15 may shift to the right or left upon cornering. For example, a driver may shift the upper body toward the center of turn from the vehicle center so as to travel with the banked vehicle body. In such a case, a straight line connecting the head of the driver and the meter display device 15 is shifted away from the vehicle center to displace the visible direction of the driver. According to the present invention, engine rotational speed can be visually recognized by means of the numeral indicating portions 36 in addition to the pointer 32 even if the visible direction is displaced. The present invention thus improves driver's visibility of the meter display device 15.

Output torque changes in accordance with rotational speed of the engine functioning as the driving source. Improvement in visibility of engine rotational speed is preferred for driver's judgement of outputtable torque. If a speed changer is provided on a power transmission path from the engine to a wheel, improvement in visibility of engine rotational speed is preferred for driver's judgement of speed change timing.

Other Embodiments

The CPU 51 changes the lighting modes of the numeral indicating portions 36 in accordance with engine rotational speed in the embodiment described above. The present invention is not limited to this case, and the numeral indicating portions can be individually lighted upon different setting so as to notify a driver of information. For example, assume a case where a driver can preliminarily set an actuation condition or a termination condition for vehicle control (the ABS, traction control, launch, or limit control). In this case, the number of the lighted numeral indicating portions can express a degree of the actuation condition (actuatability) so as to improve indication of the actuation condition to a driver. For example, the numeral indicating portion can individually indicate launch rotational speed to be set.

The engine functions as the driving source in the above embodiment. The present invention is not limited to this case, and an electric motor or the like can be provided as the driving source. A driver requires more visual recognition of rotational speed of an output shaft of a driving source in a vehicle having output torque changed in accordance with change in rotational speed of the output shaft of the driving source, a vehicle configured to change rotational speed of the output shaft of the driving source and transmit the changed rotational speed to a driving wheel, or the like. A particularly advantageous effect can be thus achieved by setting the rotational speed of the output shaft of the driving source as a vehicle state value.

In the above embodiment, the numeral indicating portions 36 having values not more than that of the engine rotational speed indicated by the pointer 32 are each lighted whereas the numeral indicating portions 36 having values more than that of the engine rotational speed indicated by the pointer 32 are each shut off. However, the present invention is not limited to this case. Alternatively, the numeral indicating portions having values not more than that of the engine rotational speed indicated by the pointer can be blinked or can be blinked at different intervals. Still alternatively, the illuminants lighting the numeral indicating portions having values not more than that of the engine rotational speed indicated by the pointer can be increased in brightness, or the numeral indicating portions can be lighted in a color other than red, such as blue. Further alternatively, the numeral indicating portions having values not more than that of the engine rotational speed indicated by the pointer can be shut off whereas the numeral indicating portions having values more than that of the engine rotational speed indicated by the pointer can be lighted. The numeral indicating portion having rotational speed larger by one scale than that of the numeral indicating portion indicated by the pointer can be lighted, or the numeral indicating portion can be lighted with temporal delay or temporal advance from the engine rotational speed indicated by the pointer.

The CPU 51 according to the above embodiment controls the lighting modes of the numeral indicating portions 36 during travel and upon provision of a set value. The present invention is not limited to this case, and the lighting modes of the plurality of index portions can be controlled at timing other than during travel and upon provision of a set value. For example, the controller can individually control the plurality of index portions upon starting operation or terminating operation so as to achieve indication of start or termination.

The scale portions 37 of the tachometer 21 according to the above embodiment are constantly lighted regardless of engine rotational speed. However, the present invention is not limited to this case. Alternatively, the scale portions 37 can be individually lighted or blinked, be changed in lighting color, or be shut off in accordance with change in vehicle state value such as engine rotational speed. Still alternatively, at least one of the scale portion and the corresponding numeral indicating portion can be individually lighted.

The pointer 32 according to the above embodiment is angularly displaced to provide analog indication of engine rotational speed. Engine rotational speed can be alternatively indicated in a digital manner. The pointer 32 is angularly displaced by the motor in accordance with an electrical signal transmitted from the ECU 70 or one of the sensors. However, the present invention is not limited to this case. The sensors can be replaced with a centrifugal tachometer, a magnetic tachometer, or the like, which mechanically reads power change according to vehicle state change to drive the pointer.

The CPU 51 according to the above embodiment controls to drive the pointer 32 via the pointer driving circuit 53 in accordance with acquired information on engine rotational speed and controls to light or shut off the plurality of LEDs via the LED driving circuit 54 so as to control the lighting modes of the numeral indicating portions 36. However, the present invention is not limited to this case. The lighting modes of the index portions have only to be associated with a vehicle state value, and may not match with the pointer position. For example, the index portions having state values larger than the vehicle state value indicated by the pointer position can be lighted. The index portions can be lighted or shut off with delay in order to prevent undesired blinking of the index portions. Conditions for lighting and a shutting off can each have a hysteresis.

The numeral indicating portions 36 are brought into the lighting modes for shifting up when engine rotational speed reaches shift-up rotational speed in the above embodiment. However, the present invention is not limited to this case. Upon shift-up operation, the numeral indicating portions 36 can be blinked upon reaching rotational speed smaller by a predetermined degree than set rotational speed. In other words, the numeral indicating portions are blinked in different manners between upon reaching the rotational speed smaller by the predetermined degree than the set rotational speed and upon reaching or exceeding the set rotational speed. For example, the numeral indicating portions are blinked with a long period (3 Hz) upon reaching the rotational speed smaller by 500 rpm than the set rotational speed and are blinked with a short period (8 Hz) upon reaching or exceeding the set rotational speed. This enables preliminarily indication to a driver of approach to shift-up rotational speed so as to achieve improvement in usability.

Constant shift-up rotational speed is set regardless of a speed reduction ratio in the above embodiment. Alternatively, shift-up rotational speed can be set for each speed reduction ratio. The numeral indicating portions may not be in the lighting modes for shifting up with the minimum speed reduction ratio.

The numeral indicating portions 36 are brought into the lighting modes different from those for a regular state when engine rotational speed reaches shift-up rotational speed in the above embodiment. However, the present invention is not limited to this case. The numeral indicating portions can be brought into lighting modes different from those for the regular state when a different condition is satisfied, instead of the case where engine rotational speed reaches shift-up rotational speed. For example, the numeral indicating portions can indicate actuation, continuation, or termination of vehicle control. Specifically, the numeral indicating portions can be blinked for a predetermined period upon actuation of vehicle control (e.g. launch control). This enables indication to a driver of actuation of vehicle control different from regular vehicle control. The numeral indicating portions can indicate actuation, as well as continuation and termination of vehicle control.

The numeral indicating portions 36 according to the above embodiment are individually lighted for indication of engine rotational speed and upon setting shift-up rotational speed. The present invention is not limited to this case, and the numeral indicating portions can be individually lighted to indicate different information. For example, the numeral indicating portions can be individually lighted in accordance with temporal change upon starting the meter display device so as to indicate a starting state by means of animation display. Alternatively, the numeral indicating portion corresponding to time can be lighted in accordance with a driver's command. Still alternatively, the numeral indicating portion corresponding to a countdown value to preset time can be lighted. The numeral indicating portions are individually lighted to highlight information in a different meter indicating portion or separately indicate information not indicated in the different meter indicating portion. A driver can be notified of various information in these cases.

The illuminants are the LEDs in the above embodiment. The present invention is not limited to this case, and the illuminants can be electroluminescence elements or electric bulbs. In order to individually light the numeral indicating portion 36, a single light source can be provided with a shutter device, such as a liquid crystal display device, configured to individually control light transmission to the numeral indicating portion, so as to individually light the numeral indicating portion. The numeral indicating portions are more preferred to be of the light emitting type rather than a reflective liquid crystal or the like.

The meter display device according to the present invention is not limited to a tachometer (engine rotational speed meter) but is applicable to an display device configured to indicate a vehicle state by means of a pointer other than that of the tachometer. The meter display device according to the present invention is applicable to a speedometer, an oil temperature gauge, a water temperature gauge, a fuel level gauge (a travelable range finder), an intake pressure gauge (a boost pressure gauge), and the like, each including a pointer.

The meter display device according to the present invention is applicable to a motorcycle as well as to vehicles other than the motorcycle. The meter display device according to the present invention is also applicable to a vehicle including front and rear wheels, such as a saddle type vehicle including three or more wheels. The present invention is suitably applicable to a vehicle of which body is slanted upon cornering.

The constituent elements described in the above and other embodiments can be obviously combined, selected, replaced, or removed where appropriate.

What is claimed is:

1. A meter display device for a vehicle, the meter display device comprising:
    a pointer body having a pointer position changed by shifting in a predetermined array direction in accordance with a continuously changing vehicle state to indicate the vehicle state;
    a display plate having a plurality of index portions configured to indicate the vehicle state at different levels, the plurality of index portions being aligned at intervals in the array direction, and the plurality of index portions being configured to individually change lighting modes; and
    a controller configured to change the lighting modes of the plurality of index portions individually in accordance with a shift of the vehicle state while the vehicle is traveling,
    wherein the controller brings the lighting modes of the plurality of index portions into a first lighting mode,
    under the first lighting mode, the plurality of index portions are changed in synchronism with the shift of the pointer body so as to represent the shift of the vehicle state indicated by the shift of the pointer body, and
    when a predetermined condition while the vehicle is traveling is satisfied, the controller brings the lighting modes of the plurality of index portions into a second lighting mode which is different from the first lighting mode.

2. The meter display device for vehicle according to claim 1, wherein
    the plurality of index portions has index values indicating the vehicle state, and
    the controller differentiates a lighting mode of an index value group including a corresponding index value to the shift of the vehicle state while the vehicle is traveling and aligned on a first side in the array direction with respect to the corresponding index value and a lighting mode of an index value group aligned on a second side in the array direction with respect to the corresponding index value.

3. The meter display device for vehicle according to claim 1, wherein
    the controller differentiates a lighting mode of a corresponding index portion to the shift of the vehicle state while the vehicle is traveling and the lighting modes of the index portions other than the corresponding index portion.

4. The meter display device for vehicle according to claim 1, wherein
    when the predetermined condition while the vehicle is traveling is satisfied, the controller brings the lighting modes of the plurality of index portions into lighting modes different from lighting modes of the plurality of index portions before the condition is satisfied.

5. The meter display device for vehicle according to claim 1, wherein
    upon providing a set value in response to a setting command due to a driver, the controller changes the lighting modes of the index portions corresponding to the set value.

6. The meter display device for vehicle according to claim 5, wherein
    the set value relates to the shift of the vehicle state while the vehicle is traveling, and the controller brings the lighting modes of the index portions corresponding to the set value into the same lighting modes as lighting modes of the index portions while the vehicle is traveling when the set value is provided in response to the setting command due to a driver.

7. The meter display device for vehicle according to claim 1, wherein
    the vehicle state relates to rotational speed of a driving source,
    the pointer body has a rotation center and is angularly displaced about the rotation center in accordance with the rotational speed,
    the array direction is equal to a circumferential direction around the rotation center, the plurality of index portions consists of numeral indicating portions aligned in the array direction, and
the numeral indicating portions correspond to the pointer position indicating the rotational speed, and upon being turned off, the numeral indicating portions take on the same color as a surface of a dial.

8. A meter display device for a vehicle, the meter display device comprising:
a pointer body having a pointer position changed by shifting in a predetermined array direction in accordance with a continuously changing vehicle state to indicate the vehicle state; and
a display plate having a plurality of index portions configured to indicate the vehicle state at different levels, the plurality of index portions being aligned at intervals in the array direction, and the plurality of index portions being configured to individually change lighting modes,
wherein the plurality of index portion include numeral indicating portions aligned in the array direction, and upon being turned off, the numeral indicating portions take on the same color as a surface of a dial,
wherein the plurality of index portions turn on according to a first lighting mode,
under the first lighting mode, the plurality of index portions are changed in synchronism with the shift of the pointer body so as to represent the shift of the vehicle state indicated by the shift of the pointer body, and
when a predetermined condition while the vehicle is traveling is satisfied, the controller brings the lighting modes of the plurality of index portions into a second lighting mode which is different from the first lighting mode.

9. The meter display device for vehicle according to claim 1, wherein
the controller brings the index portions corresponding to the shift of the vehicle state while the vehicle is traveling into a lighting mode, and changes the lighting modes of the index portions corresponding to the shift of the vehicle state while the vehicle is traveling, when the vehicle state reaches a predetermined set value.

10. The meter display device for vehicle according to claim 9, wherein
the controller blinks the index portions corresponding to the shift of the vehicle state while the vehicle is traveling, when the vehicle state reaches the predetermined set value.

11. The meter display device for vehicle according to claim 9, wherein
the predetermined set value represents a condition which is temporarily occurs while the vehicle is traveling.

12. The meter display device for vehicle according to claim 11, wherein
the predetermined set value represents at least one of a case where engine rotational speed reaches shift-up rotational speed, a case of satisfying temporal conditions, a case of satisfying a special condition that occurs temporarily while the vehicle is traveling, and a case of satisfying states of trouble or disorder.

13. The meter display device for vehicle according to claim 1, wherein
the meter display device is provided on a motorcycle.

14. The meter display device for vehicle according to claim 1, wherein
under the first lighting mode, the plurality of index portions represents rotational speed of an engine.

15. The meter display device for vehicle according to claim 1, wherein
under the first lighting mode, the plurality of index portions represents rotational speed of an engine, and
the predetermined condition is a case where engine rotational speed reaches shift-up rotational speed.

16. The meter display device for vehicle according to claim 1, wherein
under the first lighting mode, the plurality of index portions represents rotational speed of an engine, and
the predetermined condition is at least one of (i) a case of satisfying temporal conditions, (ii) a case of indicating a beginning, an end, or a continuation of a special condition that occurs temporarily while the vehicle is traveling, and (iii) a case of satisfying a state of trouble or disorder.

17. The meter display device for vehicle according to claim 1, wherein
under the first lighting mode, the plurality of index portions turn on a light without blinking, and
under the second lighting mode, the plurality of index portions which turn on under the first lighting mode blink or change in color or brightness.

18. A meter display device for a vehicle, the meter display device comprising:
a pointer body having a pointer position changed by shifting in a predetermined array direction in accordance with a continuously changing vehicle state to indicate the vehicle state;
a display plate having a plurality of numeral index portions configured to indicate the vehicle state at different levels, the plurality of numeral index portions being aligned at intervals in the array direction, and the plurality of numeral index portions being configured to individually change lighting modes; and
a controller configured to change the lighting modes of the plurality of numeral index portions in accordance with a shift of the vehicle state while the vehicle is traveling,
wherein when the vehicle state reaches a predetermined set value representing a case where engine rotational speed reaches shift-up rotational speed, the controller changes the lighting modes of the plurality of numeral index values corresponding to the shift of the vehicle state while the vehicle is traveling.

* * * * *